(12) United States Patent
Elmer

(10) Patent No.: US 11,629,468 B2
(45) Date of Patent: *Apr. 18, 2023

(54) DEVICE FOR DAMPING AND SCATTERING HYDROSOUND IN A LIQUID

(71) Applicant: Karl-Heinz Elmer, Neustadt am Ruebenberge (DE)

(72) Inventor: Karl-Heinz Elmer, Neustadt am Ruebenberge (DE)

(73) Assignee: Karl-Hieinz Elmer, Neustadt am Ruebenberge (DE)

( * ) Notice: Subject to any disclaimer, the term of this patent is extended or adjusted under 35 U.S.C. 154(b) by 523 days.

This patent is subject to a terminal disclaimer.

(21) Appl. No.: 16/801,205

(22) Filed: Feb. 26, 2020

(65) Prior Publication Data
US 2020/0190759 A1    Jun. 18, 2020

Related U.S. Application Data

(63) Continuation of application No. 15/605,963, filed on May 26, 2017, now Pat. No. 10,612,203, which is a
(Continued)

(30) Foreign Application Priority Data

Apr. 3, 2008    (DE) ..................... 10 2008 017 418.1

(51) Int. Cl.
  *E02B 3/06*    (2006.01)
  *E02B 17/00*   (2006.01)

(52) U.S. Cl.
  CPC .......... *E02B 3/062* (2013.01); *E02B 17/0017* (2013.01); *Y02A 10/11* (2018.01)

(58) Field of Classification Search
  CPC ...... Y02A 10/11; E02B 17/0017; E02B 3/062
  See application file for complete search history.

(56) References Cited

U.S. PATENT DOCUMENTS

| 1,348,828 A | 8/1920 | Fessenden |
| 2,342,813 A | 2/1944 | Mason |
| (Continued) | | |

FOREIGN PATENT DOCUMENTS

| DE | 10302219 A1 | 9/2004 |
| FR | 1267953 A   | 7/1961 |
| NL | 7301913 A   | 8/1973 |

OTHER PUBLICATIONS

U.S. Appl. No. 14/300,282, filed Jun. 10, 2014.
(Continued)

*Primary Examiner* — Forrest M Phillips
(74) *Attorney, Agent, or Firm* — Leydig, Voit & Mayer, Ltd.

(57) ABSTRACT

A device for damping hydrosound in liquid having a frequency range emitted from a sound-emitting body in the liquid includes: a plurality of individual gas volumes distributed in the liquid in an area of the sound-emitting body and at a distance from each other, each of the individual gas volumes being operable to reduce the hydrosound through resonant oscillations; and at least one mass body disposed in the liquid, the individual gas volumes being connected to the at least one mass body so as to prevent the individual gas volumes from rising up in the liquid.

36 Claims, 2 Drawing Sheets

Related U.S. Application Data continuation of application No. 14/300,282, filed on Jun. 10, 2014, now Pat. No. 9,976,270, which is a continuation of application No. 14/132,045, filed on Dec. 18, 2013, now Pat. No. 8,899,375, which is a continuation of application No. 12/936,235, filed as application No. PCT/DE2009/000413 on Apr. 1, 2009, now Pat. No. 8,636,101.

(56) References Cited

U.S. PATENT DOCUMENTS

| | | | |
|---|---|---|---|
| 3,022,632 | A | 2/1962 | Parks |
| 3,130,700 | A | 4/1964 | Peterson |
| 3,487,645 | A | 1/1970 | Frankel |
| 3,647,022 | A | 3/1972 | Meyer et al. |
| 3,842,606 | A | 10/1974 | Stiles |
| 3,855,803 | A | 12/1974 | Lacroix |
| 3,935,923 | A | 2/1976 | Wheeler |
| 4,027,486 | A | 6/1977 | Dougherty |
| 4,074,497 | A | 2/1978 | Ono |
| 4,964,756 | A | 10/1990 | Guevel et al. |
| 5,550,335 | A | 8/1996 | Ermert et al. |
| 5,658,656 | A | 8/1997 | Whitney et al. |
| 5,879,105 | A | 3/1999 | Bishop et al. |
| 5,924,261 | A | 7/1999 | Fricke et al. |
| 6,145,459 | A | 11/2000 | Takahashi et al. |
| 7,484,589 | B2 | 2/2009 | Guo |
| 7,524,139 | B2 | 4/2009 | Bishop |
| 7,686,539 | B2 | 3/2010 | Aristaghes et al. |
| 7,752,815 | B2 | 7/2010 | Lauria et al. |
| 8,256,988 | B1 | 9/2012 | Haber |
| 8,387,746 | B2 | 3/2013 | Parkin |
| 8,636,101 | B2 * | 1/2014 | Elmer .................... E02B 3/062 405/15 |
| 8,899,375 | B2 * | 12/2014 | Elmer ................ E02B 17/0017 181/175 |
| 9,976,270 | B2 * | 5/2018 | Elmer .................... E02B 3/062 |
| 10,612,203 | B2 * | 4/2020 | Elmer .................... E02D 13/005 |
| 2002/0046901 | A1 | 4/2002 | Zapfe |
| 2008/0244989 | A1 | 10/2008 | Lauria et al. |
| 2011/0031062 | A1 * | 2/2011 | Elmer .................... E02D 13/005 181/175 |
| 2015/0078833 | A1 * | 3/2015 | Elmer .................... E02D 13/005 405/195.1 |
| 2017/0306582 | A1 * | 10/2017 | Elmer ...................... E02D 7/02 |

OTHER PUBLICATIONS

U.S. Appl. No. 14/132,045, filed Dec. 18, 2013.
U.S. Appl. No. 12/936,235, filed Oct. 4, 2010.
U.S. Appl. No. 15/605,963, filed May 26, 2017.
"Reef Shores Up The Shore", Popular Mechanics, Hearst Communications Inc., New York, NY, US, vol. 172, No. t, May 1, 1995 (May 1, 1995), p. 26, XP000508324.
International Search Report of PCT/DE2009/000413, dated Feb. 10, 2009, pp. 1-6.
Dr. Manfred Schulz-Von Glahn, Dr. Klaus Betke and Dr. Georg Nehls, "Minderung des Unterwasserschalls bei Rammarbeiten fur Offshore-WEA—Praktische Erprobung verschiedener Verfahren unter Offshore-Bedingungen", Oct. 2006, pp. 1-59, ITAP (Institut fuer technische und angewandte Physik GmbH an der Universitaet Oldenburg, Germany.
Karl-Heinz Elmer, "Pile Driving Noise Reduction Using New Hydro Sound Dampers", ECS2010 Workshop: Pile driving in offshore windfarms Effects on harbor porpoises, mitigation measures and standards, Mar. 21, 2010, Stralsund, Germany, pp. 1-18.
Kevin M. Lee, et al., "Toward the Abatement of Underwater Drilling Ship Noise Using Air Bubbles", Second-yearTechnical Report Lake Travis Experiments, Feb. 3, 2011.
Mark S. Wochner, et al., "Acoustic behavior of large encapsulated gas bubbles with resonance frequencies in the 50-100 Hz range". The Journal of the Acoustical Society of America, vol. 127, issue 3, Mar. 2010, pp. 1-2.
S. N. Domenico, "Acoustic wave propagation in air-bubble curtains in water—Part I: History and theory", Geophysics, vol. 47, No. 3, Mar. 1982, pp. 345-353.

* cited by examiner

DEVICE FOR DAMPING AND SCATTERING HYDROSOUND IN A LIQUID

CROSS REFERENCE TO PRIOR APPLICATIONS

This application is a continuation of U.S. application Ser. No. 15/605,963 filed May 26, 2017, which is a continuation of U.S. application Ser. No. 14/300,282 filed Jun. 10, 2014 and issued as U.S. Pat. No. 9,976,270, which is a continuation of U.S. application Ser. No. 14/132,045 filed Dec. 18, 2013 and issued as U.S. Pat. No. 8,899,375, which is a continuation of U.S. application Ser. No. 12/936,235 filed Oct. 4, 2010 and issued as U.S. Pat. No. 8,636,101, which is a U.S. National Phase application under 35 U.S.C. § 371 of International Application No. PCT/DE2009/000413 filed Apr. 1, 2009, which claims benefit to German Application No. DE 10 2008 017 418.1 filed Apr. 3, 2008.

FIELD

The invention relates to a device for damping and scattering hydrosound and/or wave motions in a liquid, particularly water, by means of at least one envelope body enclosing a gas.

BACKGROUND

Sound waves propagate very well in liquids, since liquids such as, for example, water generally have a low damping capacity. In the sea, sound waves caused by, for example, whales or underwater construction sites are carried over many kilometers. Sound waves, however, can be hazardous to the animals in the water, such as marine mammals or fish. This applies particularly to artificially generated sound waves. Pile driving gives rise to particularly powerful acoustic emissions in water.

In addition to increasing shipping traffic, the erection of offshore wind energy installations is one of the sources of acoustic emissions in water that will increase in the future and that impose substantial stresses upon animals. Measures to reduce the acoustic emissions and to adhere to allowable limit values are necessary in order that animals, in particular protected species such as, for example, porpoises and seals, are not adversely affected by technical installations in the sea, in harbor areas and in other bodies of water.

Acoustic insulation and acoustic damping are known for the purpose of reducing the propagation of sound and wave motions in water.

Acoustic insulation is the use of reflective obstacles to impede the propagation of sound. The strength of the reflection is dependent on the difference in the wave resistances of the sound-carrying medium and the impeding medium. This effect is particularly pronounced in the case of acoustic transmission from water to air and then back from air to water. The reduction of sound propagation in water using the principle of an acoustic insulating and shielding air layer is known from DE 103 02 219 A1. The method, disclosed in the document, for reducing the transmission of sound and wave motions in the case of an object in the water relates to realization of the air layer that is to fully surround the object through, for instance, tubes, air cushions, foam layers or porous or air-filled films. In each case, the sound source must be enveloped in a completely form-fit closed manner in order to achieve the hoped-for acoustic insulating effect. Even small openings, as in the case of a door gap or similar to structure-borne sound bridges, reduce the acoustic insulating effect considerably and render it ineffective. Depending on the design of the acoustic insulation, the acoustic insulating effect is greatly reduced in the resonant ranges of the device.

Acoustic insulation thus requires a complete enveloping of the sound source. In the establishing of relieved foundation structures or the driving of sheet piling in water, complete form-fit enveloping is achievable only with a very large amount of resource, but is usually not achievable. Particularly in the offshore domain, with the motion of the sea and great depth of water, the manipulation of acoustic insulation structures is resource-intensive. Only with difficulty can a complete decoupling, i.e. the placing in the water of a continuous, vertical air layer that completely surrounds the sound source, be realized with an economically justifiable resource expenditure, particularly in the case of water depths of over ten meters. Reasons for this are the water pressure that is present and the horizontal forces from the current. A decoupling, i.e. acoustic insulation, by means of air-filled hollow bodies, such as that described in the publication DE 103 02 219 A1, always has sound bridges and resonant ranges. Thus, the air layer at the connection points of the individual hollow bodies is extremely thin, or even discontinuous. Since the resonant frequency of the hollow bodies is often in the lower frequency ranges of less than 100 Hz, these frequencies, typically often generated in the case of drilling and pile-driving operations, are transmitted or even amplified by the oscillating hollow bodies.

Further devices for acoustic insulation are described by Dr. Manfred Schulz-von Glahn, Dr. Klaus Betke and Dr. Georg Nehls in their publication "Minderung des Unterwasserschalls bei Rammarbeiten fur Offshore-WEA—Praktische Erprobung verschiedener Verfahren unter Offshore-Bedingungen". Moreover, a sound scattering and damping method, the so-called bubble curtain, is also mentioned in the publication.

Acoustic damping, by contrast, is the absorption of the sound, i.e. the conversion of the mechanical acoustic energy into heat, whereby the acoustic energy is nullified. The publication U.S. Pat. No. 3,647,022 A discloses a device for damping sound waves in a liquid medium, wherein individual sound damper elements are arranged on a carrier element, a wall of a vessel that accommodates the liquid medium constituting the carrier element that absorbs the resulting sound pressure.

In the case of liquids, which as a medium have a low damping capacity, the sound can also be damped, for example, by the oscillations of a multiplicity of gas bubbles. The sound excitation in the range of the natural frequency of the individual gas bubble results in a very effective reduction of the sound amplitudes, both through scattering and through absorption of the sound. The natural frequency of a gas bubble in this case is dependent, inter alia, on the elasticity, the pressure and the diameter of the gas bubble.

Curtains of gas bubbles have already been applied successfully in pile-driving operations in shallow water. In addition to the resonant frequency, the rise velocity of the gas bubbles is also dependent on the diameter of the gas bubbles. In a curtain having a mixture of gas bubbles of differing diameters, the larger bubbles rise very much more quickly. The gas bubbles that rise up slowly must be shielded from current influences, by means of appropriate measures. For this, it is usual to employ a so-called guided bubble curtain, in which the curtain of gas bubbles rises up within a body, the body being impermeable to current and thus having to absorb the horizontal forces from the current acting upon it. A curtain of gas bubbles can be used to influence the hydroacoustic properties of the medium water. For this purpose, the gas bubbles are usually obtained from the ambient air present above the water level and are produced in the water, usually in a plurality of planes, by means of technical equipment such as pumps and lines.

Each gas bubble is released in the water and held together by the surface tension of the water. The transmission of the sound in this case is reduced, in essence, through damping, scattering and absorption. Such a curtain is produced by means of tubes and/or pipelines laid on the ground. The tubes and/or pipelines have openings, of a defined size and quantity, through which gas is forced into the surrounding water. Usually, the air present above the water level is used as the gas for the bubbles. This air is compressed by compressors and conveyed to the tubes and/or pipelines laid on the ground. The production of such curtains of bubbles of a defined size and quantity becomes more demanding as water depth increases, since the volume of the individual rising bubble is dependent on the water depth. As the gas bubble rises in the water, the water pressure surrounding the gas bubble decreases, which results in a considerable change in the size of the gas bubble, and therefore in the effective frequency range, and in uncontrolled conditions due to non-controllable divisions and combinations of the gas bubbles. Since the resonant frequency of the bubble varies with its volume, it is necessary for bubbles to be produced continuously at differing depths, for example every five meters, in order to achieve, to some extent, controlled conditions of acoustic damping.

The production of a curtain of bubbles for the purpose of damping sound emissions from industrial installations such as oil drills or pile-driving operations for wind power installations necessitates the compression and conveyance of large quantities of compressed gas. The equipment required for this has a high energy requirement and high operating costs, which increase as water depth increases. Sound emissions are transmitted, not only through the water, but also through the ground, and can then be emitted back into the water at a distance from the sound source. From an economic and ecological point of view, however, the production of a large-area curtain is questionable. The curtain is also adversely affected by the currents in the water, resulting in the bubbles being generated in an uncontrollable manner and, ultimately, in a less effective acoustic damping.

SUMMARY

An aspect of the invention provides a device by means of which the transmission and propagation of sound and wave motions in water can be reduced, the device being such that it can be used, in a manner that is as simple, fault-free and controllable as possible, both in motionless waters and in strong currents and, irrespective of the water depth, has a low energy requirement and, insofar as possible, gives rise to no operating costs, and large-scale application is also possible at low cost.

In an embodiment, the present invention provides a device for damping hydrosound in liquid emitted from a sound-emitting body in the liquid. The device includes a plurality of envelope bodies distributed in the liquid in an area of the hydrosound-emitting body and at a distance from each other. A material, diameter and pressure of each envelope body is configured such that a natural frequency of the envelope body corresponds to an emitted frequency range of the hydrosound so as to dampen the hydrosound. The device also includes at least one mass body disposed in the liquid. The envelope bodies are connected to the mass bodies so as to prevent the envelope bodies from rising up in the liquid.

In a particular embodiment, the present invention provides a device through which water can flow, in particular in the direction of sound propagation, and which has a multiplicity of envelope bodies that are at a distance from one other and are each surrounded by water on all sides. Owing to the individual envelope bodies, and thus also the individual gas volumes or gas bubbles, being at a distance from one another, it has become possible to reduce the transmission and propagation of sound and wave motions in water by means of industrially prefabricated envelope bodies, water currents and animals being able to pass the device without exerting large forces upon the device. The invention consists in replacing the sound-damping effect of a conventional bubble curtain, whose individual air bubbles are held together by the surface tension of the water, by a bubble curtain having artificially produced hollow bodies as bubble envelopes. In this case, water flows around the envelope bodies on all sides. Ideally, the envelope body is composed of an elastic material and is filled with air. Expediently, the device is set up in such a way that the individual envelope bodies are prevented from rising up.

For this purpose, the device comprises a carrier element and a mass body. The envelope bodies in this case are arranged at a distance from one another on the carrier element. The bubble-type envelope bodies, distributed freely in the water and arranged on a carrier element, are prevented by the mass body from rising up. The envelope bodies, however, are not connected to one another either non-positively or positively or in a space dividing manner.

Surprisingly, the fact that the envelope bodies are at a distance from one another makes it possible to reduce sound propagations in water, also called hydrosound, and wave motions. In this case, an effect similar to the acoustic damping and acoustic scattering by means of a bubble curtain is produced. In contrast to the conventional bubble curtains, the gas enclosed by the envelope body is prevented by the mass body from rising up in the water. The gas volumes are thus maintained and do not have to be continuously renewed. There is no need for a continuous compressed air supply, which, particularly in the offshore domain and in deep water, is demanding of resources. Likewise, the environmental conditions prevailing in the water, such as current or water pressure, exert only a slight influence upon the device, since water flows through and/or passes around this device, since the effective volume concentration of the gas bubbles is in the range of approximately a per thousand. The envelope bodies in this case are arranged at a distance radially, axially and in the circumferential direction from a body emitting hydrosound. In addition, a gas volume enclosed in an envelope body has a constant mass, and cannot fuse with another gas bubble, or divide.

In order that the device does not move to the water surface because of the buoyancy force of the gas, it is expedient for the device, through the mass body, to have a weight that is equal to and/or greater than the buoyancy force of the device. The carrier elements to which the envelope bodies are fastened are realized as a multiplicity of individual cables, which are fastened, close to the ground, at least indirectly, for example by means of a net, to at least one mass body. These carrier elements, which to a very large extent are aligned vertically, owing to the buoyancy of the envelope bodies, can move freely horizontally, at least to a limited extent. They do not constitute any obstacle for fish or other marine life, since the carrier elements yield when an animal swims against the carrier element or envelope body of the device.

As in the case of the conventional, natural air bubbles in water, air-filled bubble envelopes, made from a flexible, thin-walled, elastic material, that are distributed in the water constitute damped resonators. The sound excitation near the natural frequency of the envelope body results in a very effective reduction of the sound amplitudes, both through scattering and through absorption. Above all, the damping effect is limited to a range around the natural frequency of the envelope bodies and to the range above the natural frequency. The natural frequency here is a function of the diameter, the adjustable elasticity and the internal pressure of the envelope body.

The diameter of an envelope body that is suitable for acoustic damping in the case of offshore construction sites, i.e. for a frequency range from 100 Hz to 1000 Hz, lies in a range from millimeters up to a few centimeters. For frequencies above 1000 Hz, the suitable diameters of the envelope bodies lie in the range of a few millimeters and below.

Through the choice of the material and the diameter, the individual prefabricated envelope bodies can be precisely matched to the required frequency range and distributed accordingly in the water, around the sound-emitting body, since, unlike natural bubbles, their position, particularly their vertical position, in the water, and therefore their effectiveness does not alter.

Consequently, a substantial advantage is achieved in comparison with natural bubbles and bubble curtains, since the air-filled envelope bodies according to the invention, which are capable of resonance and have a high damping capacity, can easily be produced, for example, with diameters of several centimeters and much greater. In the case of pile-driving operations in water, in the level determinant lower frequency range from approximately 50 Hz to 600 Hz, it is precisely bubbles of such a diameter that very effectively reduce the hydrosound through resonant oscillations. Moreover, bubbles of such magnitude are also effective above the respective natural frequency up to the kHz range, and can thus cover the entire relevant frequency range.

Large natural bubbles are unstable, ascend rapidly and disintegrate. In addition, owing to the quantity of compressed air required, it is difficult to produce them economically. Since the use of the air-filled envelope bodies makes it possible to dispense with a compressed air supply, and in the lower frequency range they are also capable of resonance around approximately 100 Hz and are very effective, they can also be used, advantageously, to reduce substantially the hydrosound emissions of finished offshore constructions such as, for example, wind power installations in the operating state. The sound energy radiated under water generally lies within this frequency range in all operating states.

Moreover, the distribution of the bubbles, or envelope bodies, in the water renders the water body compressible, whereby the reduction of the sound amplitudes is improved, both through a substantially increased effective scattering cross-section and through absorption of the sound.

Altogether, the frequency-dependent reduction of a sound wave passing through the body of water is a function, substantially, of the natural frequencies, the damping capacity, the distribution, the concentration of the air-filled envelope bodies and the dimension of the device through which the sound wave passes. In the case of the device according to the invention, the effective volume concentration is even in the range of a per thousand.

It is advantageous for the device that the envelope bodies can be positioned vertically in the water and/or horizontally in a flat manner on the ground. Since the sound waves also propagate via the ground and can emit into the water at a distance from the sound source, it is thus possible for the sound propagation via the ground also to be reduced with little resource expenditure. It is equally possible to cover the ground with envelope bodies fastened to cables or nets as with cages, distributed on the ground, in which the gas-filled envelope bodies are arranged.

It is particularly advantageous that the envelope body is a flexible membrane composed of a thin-walled, elastic material having a high damping capacity. The flexibility and elasticity of the envelope body permit an effective oscillatory excitation of the gas volume, as in the case of a natural gas bubble. The use of a material having a high damping capacity increases the overall damping of the resonantly oscillating gas volume.

It is economical to fill the envelope body with air. On the other hand, there are particular technical advantages in filling the envelope body with a gas and/or with a soft, open-pore and/or closed-pore material having a high damping capacity. It is thus possible to improve the acoustic properties of the gas volume or to adjust them according to the intended application.

It is advantageous that the envelope body is composed of an organic and/or inorganic material. It is possible, for example, to constitute the envelope body from a bubble alga (Ventricaria ventricosa), which grows on the carrier element or on the sea bed. Other suitable materials are latex or animal intestines.

The carrier element can be constituted, for example, by a woven fabric band, a cable and/or a net. It is practical for the carrier element to be flexible. It is particularly easy for the envelope body, arranged on a cable, to be positioned in the water, since one end of the cable is fastened to a further carrier element, net and/or cable having a mass body on the ground, and the other end of the cable is held on the surface of the water by a floating body. The envelope bodies can thus be positioned without difficulty, particularly in the vertical direction.

It is particularly advantageous that the envelope body is a part of the carrier element and/or the envelope bodies and the carrier body are produced as a single piece from the same material. It is thereby possible to produce a single-piece carrier element having integrated gas volumes, in which the carrier element then constitutes the envelope body.

The device is optimized in that the carrier element and the envelope body are produced as a single piece from a thin, elastic tube material, the envelope bodies of like and/or differing sizes being delimited by constrictions or weld webs of the tube material. Such a carrier element is particularly easy to produce. For example, in this case it is possible for the carrier element to be realized as a plastic tube, whose continuity is interrupted at certain intervals by constrictions or weld webs, the resultant space between the constrictions or weld webs optionally being fillable with a pressurized gas or remaining empty.

For a time-limited application, for example in the case of construction work, it is advantageous that the envelope body and/or the carrier element is/are produced from a biologically degradable material. Since such materials decompose without residue, they can remain in the water after the end of the sound emission, without affecting flora and fauna. The use of such expendable products is also economically efficient, since no recovery costs are incurred.

It is advantageous that the envelope bodies are provided with the carrier element for the purpose of fastening to the sound source. Since the gas volumes enclosed by the envelope body are put into the water together with the driven pile, it is possible, partly or entirely, to dispense with separate placing of gas bubbles, thereby reducing the costs of setting up the construction site. The envelope bodies fastened directly to the driven pile disintegrate when they reach the ground, whereby the gas volume is released, rises up as a natural gas bubble and is lost. The empty envelope body and the carrier element then remain on the ground and decompose over time. The envelope bodies in this case can be fastened, with the carrier element, to the sound source either singly or in a plurality of layers.

It is advantageous that the device is arranged in the water-filled interior of a component and/or of a driven pile realized, in particular, as a steel tube. This enables the device to be arranged in the component even before the latter is shipped. There is then no manipulation of the device according to the invention at the construction site, this significantly improving the application and, in particular, the cost-effectiveness of the device.

It proves to be particularly expedient that the carrier element is arranged in a cage. Such a cage can be prepared industrially on land, for the specific intended application, and is then erected at the application site. This provides for the realization of bubble curtains of any given concentration of bubbles, as well as greater dimensions of the width, length, height and diameter of the device.

For optimal exploitation of this property, it is appropriate that the cage, in its supporting structure, is composed of a solid material such as metal or plastic and/or that a plurality of cages can be arranged and/or fixed above and next to one another. It is thus possible for the cages to be made from ISO containers without wall faces, this enabling the cages to be transported without difficulty on land and to water, and being extremely cost-effective.

It is extremely useful that the envelope bodies can be fixed in a cage by means of the carrier elements. Thus, it is possible for the envelope bodies to be prepared industrially on land for the specific intended application. The envelope bodies can be filled with gas on land and/or subsequently in the water. In the cage, the gas-filled envelope bodies are protected in a simple manner against excessive mechanical load, and can be transported on land and on water without difficulty. In addition, the setting-up and recovery of the envelope bodies at the application site can thus be effected rapidly, and with standardized equipment. After use, the cages are simply recovered from the water and can be reused.

Another advantageous exploitation of the invention consists in that at least two cages can be arranged telescopically within one another. This provides for compact transport on land and for rapid set-up and dismantling in the water.

It is advantageous that the envelope body has a valve. By means of the valve, it is possible for the gas pressure in the envelope body to be altered before, during and/or after an application. It is particularly advantageous in this case that the valves of a plurality of envelope bodies are connected to one another. This enables the gas pressure to be altered simultaneously in a plurality of envelope bodies.

It is advantageous that each individual envelope body can be filled individually with a different gas and/or at a different pressure. Thus, it is possible for each envelope body to be produced with the required resonance and damping properties, according to the requirements, such as position, water depth and sound frequency.

It is particularly practical that the device is provided with a floating body. The floating body, which is always on the surface of the water, enables the device to be transported, laid out and retrieved in a simple manner, for example in a manner similar to that of a fishing net.

It proves expedient that the device can be deployed invisibly under water in coastal protection, for example off the coast, as a wave breaker in harbor entrances, in order to reduce the waves. If two groups of envelope bodies, for example in cages, are set up so as to stand parallel to one another in the water, an effect is achieved whereby the wave motions between the groups are reduced, in a manner similar to that of a splitter attenuator. With such an arrangement it is possible, for example, to reduce the wave motions in relatively open or unprotected harbors.

It is advantageous that individual envelope bodies and/or carrier elements can be filled on-site with a gas, for example compressed air, for the purpose of supplementing existing envelope bodies and/or generating buoyancy, stability and/or for the purpose of spatial development of the device. This enables the device to be transported as a compact pack to the application site and, for example, the spatial development of the device under water to be realized by means of compressed air, without the deployment of personnel, or with deployment of only a small number of personnel.

It is advantageous that the device can be used for shielding hydrosound and waves. This makes it possible, for example, for seismic investigations of a bed of a body of water to be shielded against external interference noises.

It has proved expedient that individual envelope bodies or a plurality of envelope bodies are arranged in a protective housing, in particular made of a wire mesh or of a dimensionally stable plastic, the protective housing having at least one opening, and the water being able to flow through the protective housing. This enables the sensitive envelope bodies, for example made from thin latex, to be protected against damage. The envelope bodies are subjected to high mechanical loads, particularly during transport and installation, but can also be damaged in the water by animals, for example by being eaten, or by objects transported by the current.

BRIEF DESCRIPTION OF THE DRAWINGS

The invention permits various embodiments. To elucidate the basic principle of the invention, two embodiments thereof are represented in the drawing and described in the following. In the drawing.

DETAILED DESCRIPTION

Figure 1:
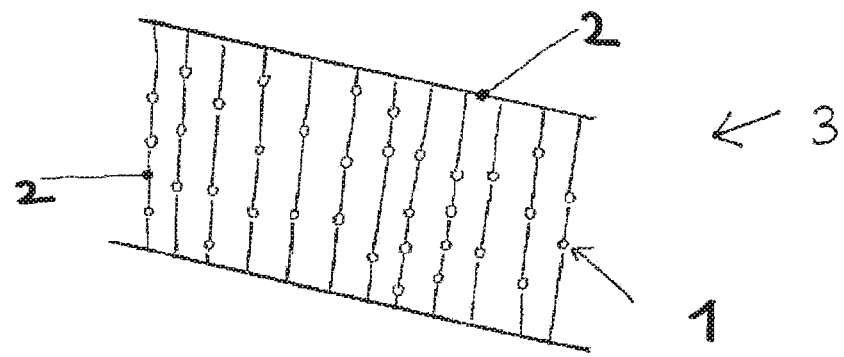
FIG. 1 shows a schematic side view of a device.
Figure 2:
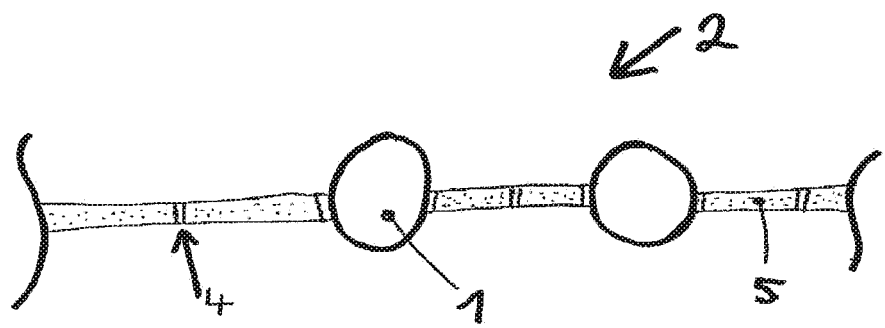
FIG. 2 shows a cut and enlarged representation of a portion of the device shown in FIG. 1.

FIGS. 1 and 2 show a device 3 having a carrier element 2. In the embodiment represented here, the carrier element 2 is composed of a multiplicity of tubes made of a plastic film. Each individual tube is divided into a plurality of portions. Individual portions are filled with a gas and constitute pressurized envelope bodies 1 that are at a distance from one another. The individual portions are divided by weld webs 4. The portions differ in size. In the embodiment shown here, portions that are not filled with a gas have a perforation 5.

Figure 3:
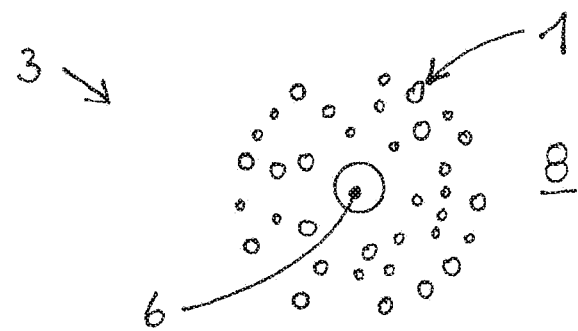
FIG. 3 shows a horizontally cut schematic representation of an offshore construction site with the device according to the invention.
Figure 4:
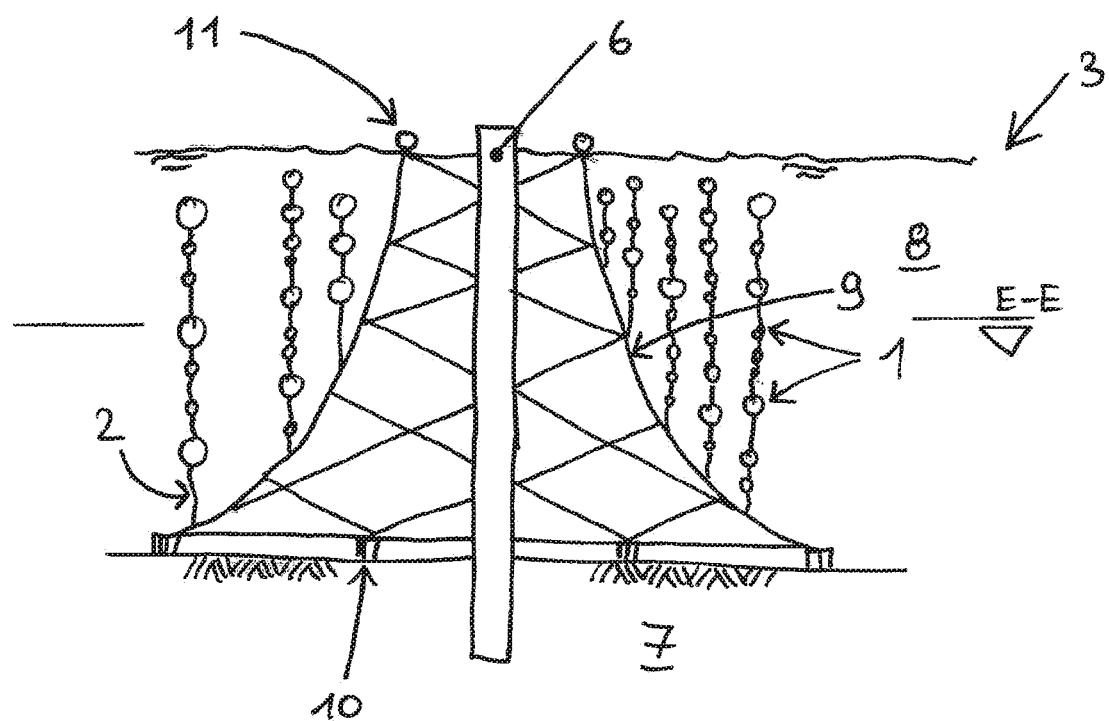
FIG. 4 shows a schematic representation of a section through an offshore construction site with the device according to the invention, in a first embodiment.

FIG. 3 shows a schematic representation of an offshore construction site, cut horizontally in the plane E-E of FIG. 4, in which a driven pile 6 is driven into the ground. The device 3 has a multiplicity of gas-filled envelope bodies 1, which are at a distance from one another, flexibly connected to one another, and are each surrounded by water 8 on all sides. This enables water 8 to flow through the device 3, in particular in the direction of sound propagation. Thus, water currents and animals can pass the device 3 without exerting large forces upon the device 3. The envelope bodies 1 in this case are arranged at a distance radially, axially and in the circumferential direction from the body 6 emitting the hydrosound.

FIG. 4 shows a schematic representation of a section through an offshore construction site, in which a driven pile 6 is driven into the ground 7. The device 3 is arranged so as to surround the driven pile 6 in the water 8. The device 3 is composed of a net 9, on which carrier elements 2 are arranged. Envelope bodies 1 that enclose gas are fastened to the carrier elements 2. The envelope bodies 1 in this case are arranged at a distance radially, axially and in the circumferential direction from the body 6 emitting the hydrosound. In order to counter the buoyancy of the gas, the net 9 is fixed to the ground by means of mass bodies 10. Above the surface of the water, the net 9 is fastened to floating bodies 11.

Figure 5:
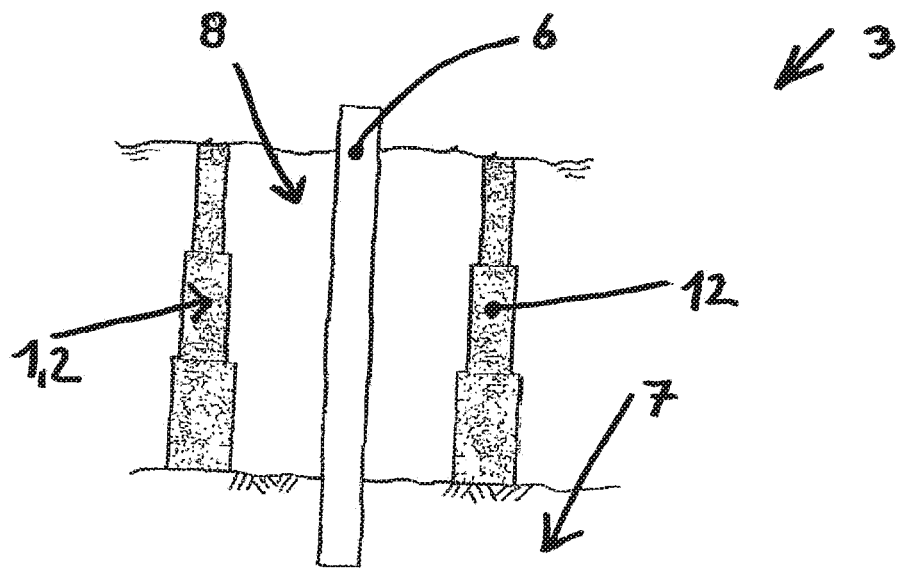
FIG. 5 shows a schematic representation of a section through an offshore construction site with the device according to the invention, in a second embodiment.

FIG. 5, like FIG. 4, shows a section through an offshore construction site, in which a driven pile 6 is driven into the ground 7. In contrast to FIG. 3, the device 3 surrounding the driven pile 6 in the water 8 is composed of cages 12. The cages 12 are open, and water 8 flows through them, as in the case of the net 9 in FIG. 4. The envelope bodies 1 enclosing the gas are fastened in the cages 12 by means of the carrier elements 2 clamped in the cages 12. A plurality of cages 12 can be stacked next to and above one another. Likewise, it is possible to realize the cages 12 in such a way that a plurality of cages 12 fit into one another and are drawn apart telescopically at the application site.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A device for damping hydrosound in liquid having a frequency range emitted from a sound-emitting body in the liquid, the device comprising:
    a plurality of individual gas volumes distributed in the liquid in an area of the sound-emitting body and at a distance from each other, wherein each of the individual gas volumes is operable to reduce the hydrosound through resonant oscillations; and
    at least one mass body disposed in the liquid, the individual gas volumes being connected to the at least one mass body so as to prevent the individual gas volumes from rising up in the liquid.

2. The device as recited in claim 1, wherein at least a first individual gas volume of the plurality of individual gas volumes comprises a same gas as at least a second individual gas volume of the plurality of individual gas volumes, and/or at least the first individual gas volume is at a same pressure as at least the second individual gas volume.

3. The device as recited in claim 1, further comprising at least one floating body connected to the individual gas volumes.

4. The device as recited in claim 1, further comprising a plurality of carrier elements attached to the individual gas volumes.

5. The device as recited in claim 4, wherein the individual gas volumes are disposed along the carrier elements so as to be positioned at different depths within the water.

6. The device as recited in claim 5, wherein the individual gas volumes are connected to the at least one mass body by the carrier elements.

7. A device for damping hydrosound in liquid having a frequency range emitted from a sound-emitting body in the liquid, the device comprising:
    a plurality of individual gas volumes distributed in the liquid in an area of the sound-emitting body, wherein each of the individual gas volumes is operable to reduce the hydrosound through resonant oscillations; and
    at least one carrier element attached to the individual gas volumes, the individual gas volumes being arranged at a distance from one another along the carrier element.

8. The device as recited in claim 7, wherein at least a first individual gas volume of the plurality of individual gas volumes comprises a same gas as at least a second individual gas volume of the plurality of individual gas volumes, and/or at least the first individual gas volume is at a same pressure as at least the second individual gas volume.

9. The device as recited in claim 7, further comprising at least one mass body disposed in the liquid, the individual gas volumes being connected to the at least one mass body so as to prevent the individual gas volumes from rising up in the liquid.

10. The device as recited in claim 9, wherein the individual gas volumes are connected to the at least one mass body by the at least one carrier element.

11. The device as recited in claim 7, wherein the individual gas volumes are disposed along the at least one carrier element so as to be positioned at different depths within the water.

12. The device as recited in claim 7, further comprising at least one floating body connected to the individual gas volumes.

13. A device for damping hydrosound in liquid having a frequency range emitted from a sound-emitting body in the liquid, the device comprising:
- a plurality of gas bubbles distributed in the liquid in an area of the sound-emitting body and at a distance from each other, wherein each of the gas bubbles is operable to reduce the hydrosound through resonant oscillations; and
- at least one mass body disposed in the liquid, the gas bubbles being connected to the at least one mass body so as to prevent the gas bubbles from rising up in the liquid.

14. The device as recited in claim 13, wherein at least a first gas bubble of the plurality of gas bubbles comprises a same gas as at least a second gas bubble of the plurality of gas bubbles, and/or at least the first individual gas bubble is at a same pressure as at least the second gas bubble.

15. The device as recited in claim 13, further comprising at least one floating body connected to the gas bubbles.

16. The device as recited in claim 13, further comprising a plurality of carrier elements attached to the gas bubbles.

17. The device as recited in claim 16, wherein the gas bubbles are disposed along the carrier elements so as to be positioned at different depths within the water.

18. The device as recited in claim 17, wherein the gas bubbles are connected to the at least one mass body by the carrier elements.

19. A device for damping hydrosound in liquid having a frequency range emitted from a sound-emitting body in the liquid, the device comprising:
- a plurality of gas bubbles distributed in the liquid in an area of the sound-emitting body, wherein each of the gas bubbles is operable to reduce the hydrosound through resonant oscillations; and
- at least one carrier element attached to the gas bubbles, the gas bubbles being arranged at a distance from one another along the carrier element.

20. The device as recited in claim 19, wherein at least a first gas bubble of the plurality of gas bubbles comprises a same gas as at least a second gas bubble of the plurality of gas bubbles, and/or at least the first individual gas bubble is at a same pressure as at least the second gas bubble.

21. The device as recited in claim 19, further comprising at least one mass body disposed in the liquid, the gas bubbles being connected to the at least one mass body so as to prevent the gas bubbles from rising up in the liquid.

22. The device as recited in claim 21, wherein the gas bubbles are connected to the at least one mass body by the at least one carrier element.

23. The device as recited in claim 19, wherein the gas bubbles are disposed along the at least one carrier element so as to be positioned at different depths within the water.

24. The device as recited in claim 19, further comprising at least one floating body connected to the gas bubbles.

25. A device for damping hydrosound in liquid having a frequency range emitted from a sound-emitting body in the liquid, the device comprising:
- a plurality of tunable resonators distributed in the liquid in an area of the sound-emitting body and at a distance from each other, wherein each of the tunable resonators is operable to reduce the hydrosound through resonant oscillations; and
- at least one mass body disposed in the liquid, the tunable resonators being connected to the at least one mass body so as to prevent the tunable resonators from rising up in the liquid.

26. The device as recited in claim 25, wherein at least a first tunable resonator of the plurality of tunable resonators comprises a same gas as at least a second tunable resonator of the plurality of tunable resonators, and/or at least the first tunable resonator is at a same pressure as at least the second tunable resonator.

27. The device as recited in claim 25, further comprising at least one floating body connected to the tunable resonators.

28. The device as recited in claim 25, further comprising a plurality of carrier elements attached to the tunable resonators.

29. The device as recited in claim 28, wherein the tunable resonators are disposed along the carrier elements so as to be positioned at different depths within the water.

30. The device as recited in claim 29, wherein the tunable resonators are connected to the at least one mass body by the carrier elements.

31. A device for damping hydrosound in liquid having a frequency range emitted from a sound-emitting body in the liquid, the device comprising:
- a plurality of tunable resonators distributed in the liquid in an area of the sound-emitting body, wherein each of the tunable resonators is operable to reduce the hydrosound through resonant oscillations; and
- at least one carrier element attached to the tunable resonators, the tunable resonators being arranged at a distance from one another along the carrier element.

32. The device as recited in claim 31, wherein at least a first tunable resonator of the plurality of tunable resonators comprises a same gas as at least a second tunable resonator of the plurality of tunable resonators, and/or at least the first tunable resonator is at a same pressure as at least the second tunable resonator.

33. The device as recited in claim 31, further comprising at least one mass body disposed in the liquid, the tunable resonators being connected to the at least one mass body so as to prevent the tunable resonators from rising up in the liquid.

34. The device as recited in claim 33, wherein the tunable resonators are connected to the at least one mass body by the at least one carrier element.

35. The device as recited in claim 31, wherein the tunable resonators are disposed along the at least one carrier element so as to be positioned at different depths within the water.

36. The device as recited in claim 31, further comprising at least one floating body connected to the tunable resonators.

* * * * *